United States Patent
Kaibel et al.

(10) Patent No.: US 6,757,539 B2
(45) Date of Patent: Jun. 29, 2004

(54) METHOD AND DEVICES FOR DIALLING SERVICES

(75) Inventors: Martin Kaibel, Aachen (DE); Heinz-Peter Keutmann, Eschweiler (DE); Peter Kobriger, Aachen (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 477 days.

(21) Appl. No.: 09/725,705

(22) Filed: Nov. 29, 2000

(65) Prior Publication Data

US 2001/0009854 A1 Jul. 26, 2001

(30) Foreign Application Priority Data

Nov. 30, 1999 (EP) .............................................. 99123766

(51) Int. Cl.[7] ................................................. H04Q 7/20
(52) U.S. Cl. ................... 455/445; 455/448; 379/221.14
(58) Field of Search ................................ 455/445, 448, 455/433, 558; 379/142.07, 221.14, 265.11

(56) References Cited

U.S. PATENT DOCUMENTS

| | | | | |
|---|---|---|---|---|
| 5,131,019 A | * | 7/1992 | Sheffer et al. ................. | 379/39 |
| 5,712,900 A | * | 1/1998 | Maupin et al. .............. | 455/433 |
| 5,719,929 A | * | 2/1998 | Menard .................. | 379/216.01 |
| 6,130,941 A | * | 10/2000 | Nimmagadda et al. ..... | 379/230 |
| 6,137,806 A | * | 10/2000 | Martinez .................... | 370/428 |
| 6,192,349 B1 | * | 2/2001 | Husemann et al. ........... | 705/65 |
| 6,490,464 B1 | * | 12/2002 | Oda ........................... | 455/558 |
| 6,556,996 B1 | * | 4/2003 | Kovarik et al. ............... | 707/10 |

FOREIGN PATENT DOCUMENTS

| | | | | |
|---|---|---|---|---|
| DE | 4421508 A1 | * | 12/1994 | .......... H04M/11/04 |
| WO | WO 9623385 A1 | * | 8/1996 | .......... H04M/11/04 |
| WO | WO 9723104 A1 | * | 6/1997 | ............ H04Q/7/22 |
| WO | WO 98/23108 | | 5/1998 | |
| WO | WO 99/40748 | | 8/1999 | |
| WO | WO 9963770 A2 | * | 12/1999 | ............ H04Q/7/00 |

OTHER PUBLICATIONS

Heinrich, D. European Search Report, May 15, 2000, App. No. EP 99 123766, pp. 1–3.

* cited by examiner

Primary Examiner—Cong Van Tran

(57) ABSTRACT

A method and devices for dialling services in a mobile telecommunication network include a set of stored character strings used for comparison with character strings entered by a subscriber to call a service is modified, if a mobile user equipment switches from or to a visited telecommunication network.

10 Claims, 3 Drawing Sheets

METHOD AND DEVICES FOR DIALLING SERVICES

BACKGROUND OF THE INVENTION

Technical Field of the Invention

The invention relates to a method and devices for the provision of services in visited telecommunication networks.

DESCRIPTION OF RELATED ART

Many subscribers of mobile telecommunication networks, such as a GSM (Global System for Mobile Communication) or a UMTS (Universal Mobile Telecommunication System) network, use services offered by network operators or others. Examples of such services are information services, stock exchange information services, schedule information or emergency call services such as police emergency calls or life saving services. A service as defined in the present application can also be an organisation or private person working or known on an international basis, or a service offered in a comparable manner in a multitude of networks. In many cases it is desirable to call a service without knowing the number of said service or without having to find it out. Such a situation can arise, for example, if a subscriber wants to check different alternative transport possibilities at the end of an event. In this case it is less desirable, if he has to inquire and remember a multitude of phone numbers by means of an information service first. In an emergency case frequently the situation arises, where a person involved no longer remembers the correct emergency call number. Here, too, it does not appear sensible, if he has to find out the corresponding phone number first.

As far as emergency call services are concerned, a large number of simplifications are offered enabling a subscriber to reach an emergency call service without knowing the phone number. Patent FI-9500335 introduces an emergency call device, which dials a desired emergency call service by operating one single key. The utility model DE-29809959 describes a similar device, wherein a subscriber can choose from a plurality of emergency call services. Both devices have pre-set emergency call numbers memorised internally, thereby requiring that a subscriber is presently located in the applicable area of the pre-set numbers. Thus, said devices can only be used in one or a few telecommunication networks.

The U.S. Pat. No. 5,719,929 describes a system wherein character strings used for dialling services, in said patent named special numbers, are stored in a mobile user equipment. A phone number, entered by a mobile subscriber, is compared in the mobile user equipment with a set of stored special numbers. If the dialled number is found among the stored special numbers, a special number indicator is sent to a mobile network. The mobile network translates the special number indicator to a phone number for the service indicated by the indicator.

By this, a mobile subscriber can use the same phone number world wide to reach a service.

However, the system introduced by the U.S. Pat. No. 5,719,929 would not recognise a special number that is used in a visited mobile telecommunication system for dialling services.

SUMMARY OF THE INVENTION

It has thereby proved to be an advantage that a desired call can be entered in either way, as known in the home telecommunication network of a subscriber as well as known in any visited telecommunication network. By this, a mobile user equipment can be used not only by the subscription owner but by any person in the visited telecommunication network to call a service.

It is moreover advantageous that services called by the subscriber are offered in a language the subscriber is familiar with.

The use of character strings is advantageous, as said input form is used by the majority of the subscribers.

It is particularly advantageous to be able to delete the character strings upon leaving a visited telecommunication network. Thus, unintended emergency calls from a telecommunication network, in which the deleted character strings can have different meanings, are avoided.

It is particularly advantageous to store pre-defined character strings on a subscriber identification card such as a SIM (Subscriber Identification Module) or a PCMCIA (Personal Computer Memory Card International Association) card. Thus, a mobile user equipment can be used in a plurality of networks.

It is an advantage that the mapping node is a control node of a core network, as in general said nodes are used for switching tasks. A suitable node is, for example, an MSC (Mobile Services Switching Centre) or an SGSN (Supporting General Packet Radio Service Support Node).

It is an advantage that a subscriber identification is transmitted, which allows a more selective support of the subscriber as well as the avoidance of unnecessary service calls and an improved service by the called service.

It is advantageous to recognise the preferred language by means of a language indicator, as said language indicator is adjusted by the subscriber himself, the service is offered in exactly the language selected by the subscriber for the communication with his mobile user equipment.

DETAILED DESCRIPTION OF EXEMPLARY EMBODIMENTS OF THE INVENTION

Figure 1:
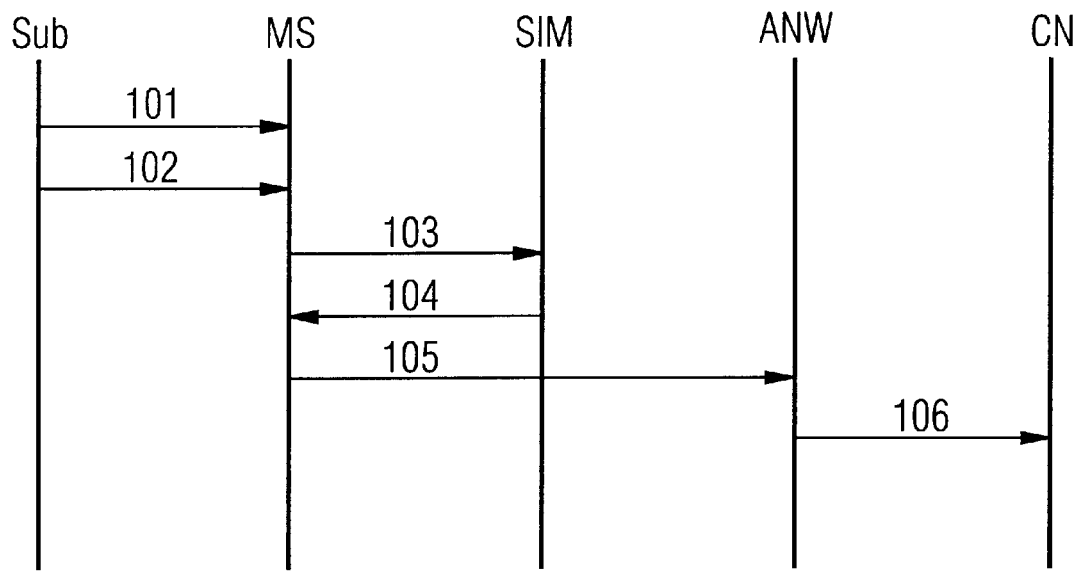
FIG. 1 shows a schematic diagram of the method for reaching a service as state of the art.

In general, a telecommunication network comprises an access network and a core network. An access network is a network allowing at least one subscriber to access to a core network. The access network administers the resources required therefor, such as radio channels, sending and transmitting means as well as connections to the core network. A core network comprises at least one control node. It offers a subscriber at least one telecommunication service such as telephone, facsimile or data transmission. Moreover, it attends to tasks like mobility administration and subscriber authentication. A control node is a device in a core network offering at least one of the functions of the core network.

It is one implementation of the invention to update the contents of a stored list of character strings, when the telecommunication network is changed. The change of a telecommunication network is recognised by both a mobile user equipment and by a visited network through the attachment of the mobile user equipment in the visited network. Thus, a network operator can update the list of character strings in a mobile user equipment by means of data transmission, for example, by means of using a so-called SIM Application Toolkit. The network operator stores dialling numbers being defined in his network for services in the mobile user equipment. Said implementation allows the use of the dialling numbers defined in the home network of a subscriber as well as the use of the dialling numbers defined in a visited network. A subscriber using the mobile user equipment can thus use the character string common in his home network and in the visited network for keying in a desired call. A subscriber of a German network being with his mobile user equipment in England, therefore, has the choice, e.g. for calling the police, between the character string 999 used in England and the character string 110 used in Germany. When leaving the visited telecommunication network the character strings used in said network are preferably deleted. This prevents an unintended dialling of a service. In the above-mentioned example, the attempt to reach a subscriber under the dialling number 99 93 24 would otherwise result in an emergency call.

In an embodiment of the invention, a mobile user equipment detects a change from a visited telecommunication network to a further telecommunication network during an attachment. It removes all character strings stored for the visited telecommunication network.

In a further embodiment of the invention, a node of a visited telecommunication network initiates the removal of all character strings stored for another visited telecommunication network, for example during an attachment.

The storage of pre-defined desired calls and character strings can be performed on a subscriber identification card or on a fixed integrated memory component in the mobile user equipment.

An identification of a dialling subscriber can also take place implicitly. For this purpose, a mobile user equipment identifier, e.g. an International Mobile Equipment Identity is transmitted instead of a subscriber identification.

In the following, the state of the art is explained in more detail by means of FIG. 1.

In a method for dialling a service in a mobile telecommunication network a caller Sub first keys in a desired call into a mobile user equipment MS in a first step 101. This can, for instance, be done by means of choosing from a pre-defined menu or a voice input. In a next step 102 said desired call is declared as having been completed towards the mobile user equipment MS. In the mentioned examples, this can, for instance, be done by pressing a key or by terminating the voice input. In its processing unit for mapping a desired call to a service, the mobile user equipment maps the desired call into a service identifier. A service identifier is an indication clearly identifying one service within a number of services. This can, for instance, be realised by means of an 8 bit parameter.

The storage of desired calls and of service identifiers and the allocation thereof are realised on a subscriber identification card SIM in the form of a table. The storage and allocation can also be realised by means of a fixed integrated storage component having volatile or non-volatile memory contents. For reducing access times, information stored on a subscriber identification card are often copied into a memory component of the mobile user equipment. The processing unit for mapping a desired call to a service sends an inquiry to the subscriber identification card SIM in an additional step 103. The subscriber identification card returns the corresponding service identifier in a next step 104. In a further step 105 the mobile user equipment MS sends said service identifier within a call request to an access network ANW by means of its sending unit.

The access network ANW forwards said call inquiry including the service identifier to a control node CN of a core network in another step 106. The control node CN converts the service identifier into a dialling number. The control node thereafter initiates with its means for setting up a call the call set-up to the called service.

Figure 2:
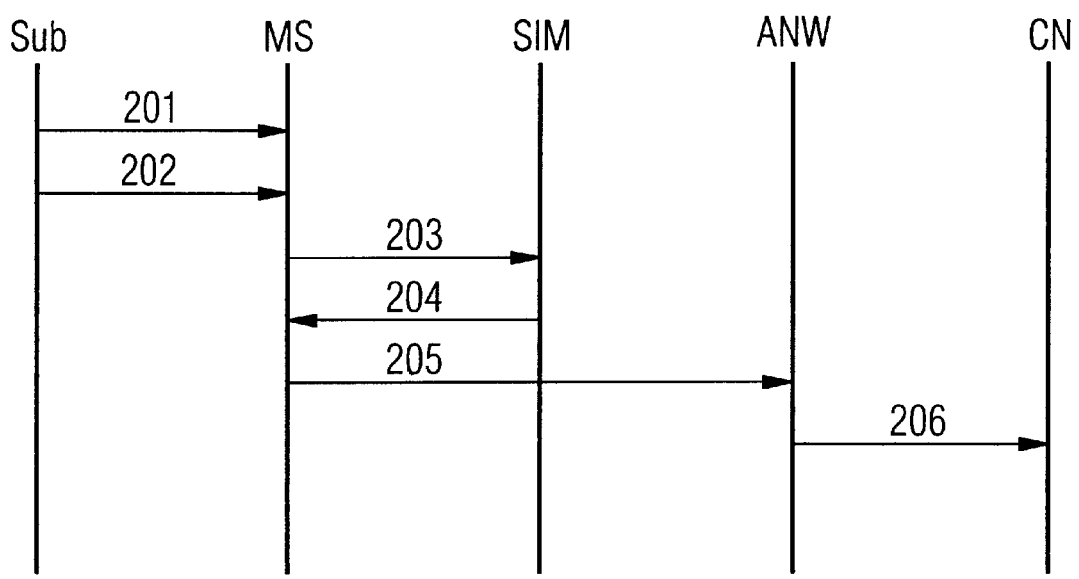
FIG. 2 shows a schematic diagram of the method with the additional transmission of a language indicator.

In the following, an embodiment of the invention is explained in more detail by means of FIG. 2.

In the method for dialling a service in a mobile telecommunication network, a caller Sub keys in a desired call into a mobile user equipment MS in a first step 201. This is done by keying in a character string into the mobile user equipment MS, e.g. by means of a keyboard or through voice input.

In another step 202 said desired call is declared as having been completed towards the mobile user equipment MS, for instance, by pressing a key or by using a pre-defined voice signal. The mobile user equipment compares the keyed in character string with a list of pre-defined character strings in its processing unit for converting character strings into service identifiers. If the keyed in character string is found in the list, it is converted into a service identifier by means of the processing converting unit. The memory for storing character strings and for storing service identifiers as well as an allocation provision of character strings to service identifiers are stored on a subscriber identification card SIM in the form of a table. The memory can also be implemented as a memory component fixedly integrated in the mobile user equipment and having volatile or non-volatile memory contents. For the conversion the processing converting unit sends an inquiry to the subscriber identification card SIM in an additional step 203. It is prior art that, for example, a subscriber of a GSM network sets a preferred language for device notifications in his mobile user equipment. Said setting is stored on the subscriber identification card. A language indicator is derived from the language settings stored on the subscriber identification card.

The subscriber identification card SIM responds to the inquiry according to step 203 with the corresponding service identifier and the language indicator in another step 204. In a further step 205 the mobile user equipment MS sends said service identifier and the language indicator in a call inquiry to an access network ANW.

The access network ANW forwards said call inquiry including the service identifier and the language indicator to a control node CN of a core network in another step 206. By means of its processing unit for mapping service identifiers to dialling numbers the control node CN maps the received service identifier into a dialling number, under which the selected service can be reached in the preferred language. For this purpose a list of dialling numbers is stored under a service identifier, wherein each dialling number is allocated to a language. By means of recognising a language indicator, the preferred language is determined. If the language preferred by the subscriber is included in the list, the means for allocating select a corresponding dialling number, if not, a first dialling number from the list is selected. Thereafter the control node comprising means for setting up a call starts the call set-up to the dialled service using the selected number.

In the case where no language indicator is transmitted, the means for determining a country code determine a country code on the basis of the subscriber identification. A subscriber identification comprises, among others, a country code of a home telecommunication network of the identified subscriber, in GSM networks, for instance, a so-called mobile country code. The means for allocating determine the number on the base of said country code. The preferred used language is then an official language of the country.

In case of a service call with a mobile user equipment not comprising a subscriber identification card, the service identifiers and desired calls as well as the allocation of service identifiers to desired calls are stored in a memory component having non-volatile memory contents, i.e. in a memory component maintaining its contents also after the voltage supply has been interrupted.

Figure 3:
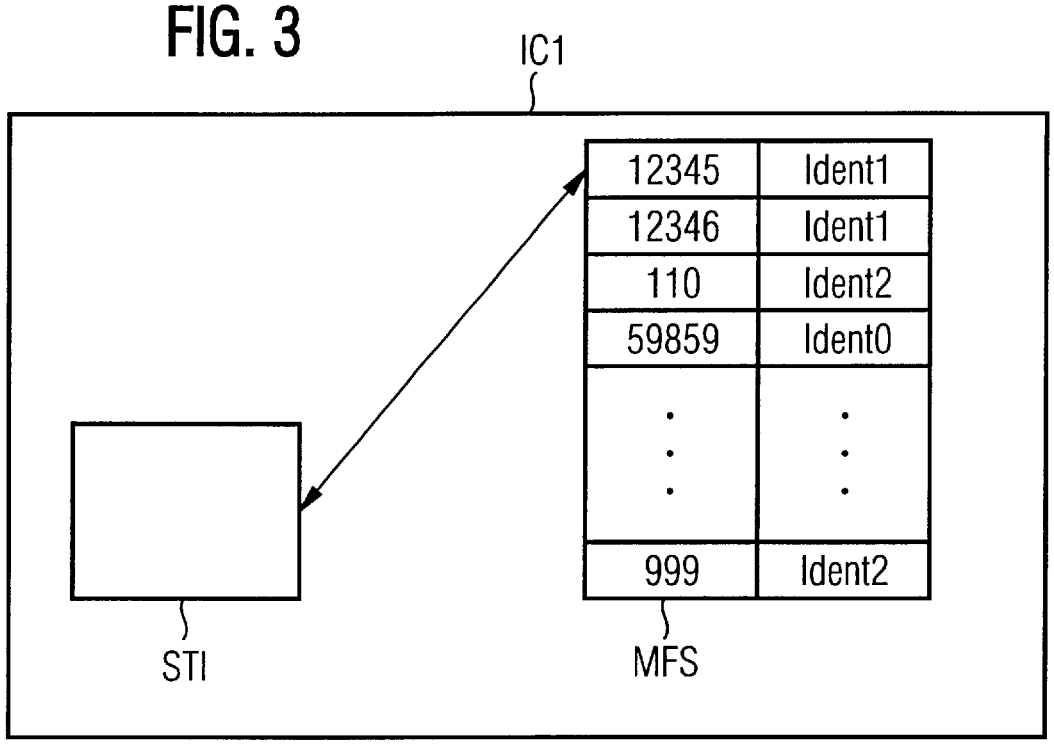
FIG. 3 shows a schematic illustration of a device in a Mobile user equipment for mapping a desired call to a service.

The calling of a service is in the following explained in more detail by means of FIG. 3. FIG. 3 shows a circuit IC1. By means of said circuit IC1 a processing unit for mapping a desired call to a service is realised in a mobile user equipment. The circuit IC1 comprises a memory MFS having pre-defined character strings as well as service identifiers allocated to each other. The memory MFS, for example, stores the character strings 12345, 12346, 110, 59859 up to 999 and the service identifiers Ident0, Ident1 and Ident2. In a simplified embodiment the memory MFS can also comprise merely one or several service identifiers. Each of the service identifiers shown on the right-hand side is thereby allocated to the corresponding character string on the left-hand side. The circuit IC1 comprises additionally a receiving and processing unit ST1 for receiving and comparing character strings. If a character string is entered into the mobile user equipment, the processing unit compares this character string with the character strings stored in memory MFS. If they match, it returns the corresponding service identifier. This means that the caller wants to make a service call. In this case the service identifier is transmitted to the telecommunication network, for example, in a call request. The caller may be given priority, for instance, if the called service is an emergency call centre. If no matching character string is found, the desired call is continued to be handled as a normal call. The processing unit can also be realised as a computer program in a mobile user equipment.

Figure 4:
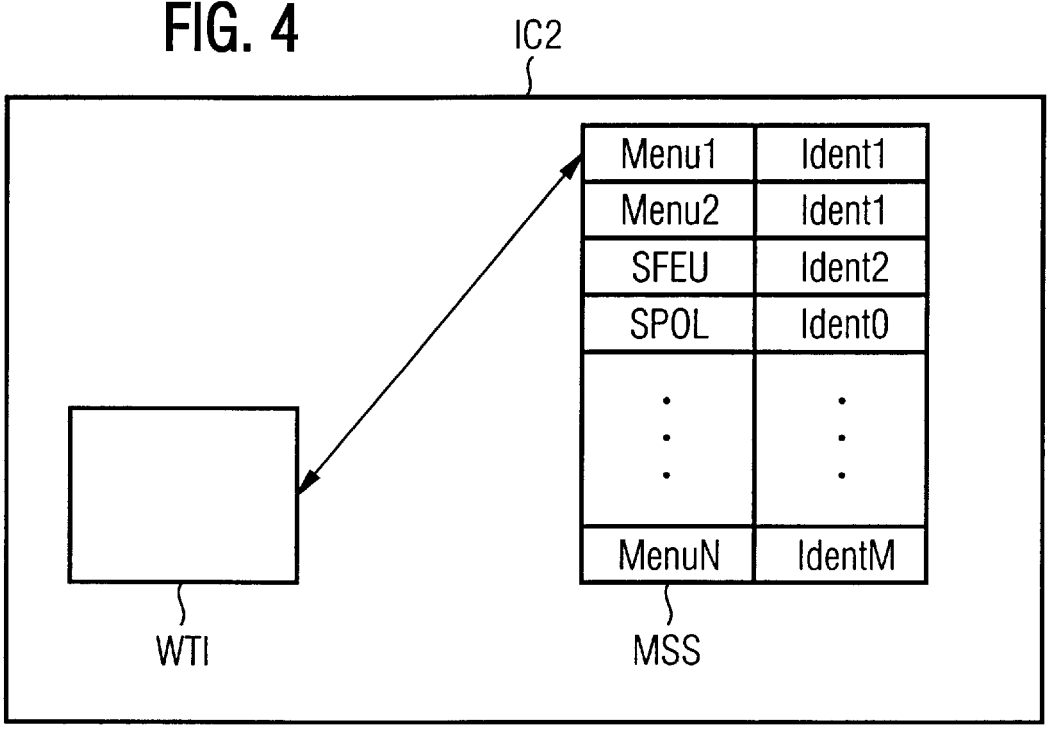
FIG. 4 shows a schematic illustration of an additional device in a mobile user equipment for mapping a desired call to a service.

The calling of a service by menu selection or a voice-controlled selection of services is hereinafter explained by means of FIG. 4. FIG. 4 depicts a circuit IC2 by means of which a processing unit for mapping desired calls to a service in a mobile user equipment is realised. The circuit IC2 comprises a memory MSS, which contains both pre-defined desired calls and service identifiers, wherein the service identifiers are allocated to the pre-defined desired calls. The memory MSS comprises, for instance, the desired calls Menu1, Menu2, SFEU, SPOL and MenuN as well as the service identifiers Ident0, Ident1, Ident2 and IdentN. Each of the service identifiers shown on the right-hand side is thereby allocated to the corresponding desired call on the left-hand side. The circuit IC2 moreover comprises a receiving and processing unit WT1 for receiving and comparing desired calls. If a desired call is keyed into the mobile user equipment, the processing unit WTI picks said desired call out of the desired calls stored in the memory MSS and transmits the pertinent service identifier to a telecommunication network, for instance, in a call request. The call may be given priority, e.g. if the called service is an emergency call centre. The processing unit can also be realised as a computer program in a mobile user equipment.

Figure 5:
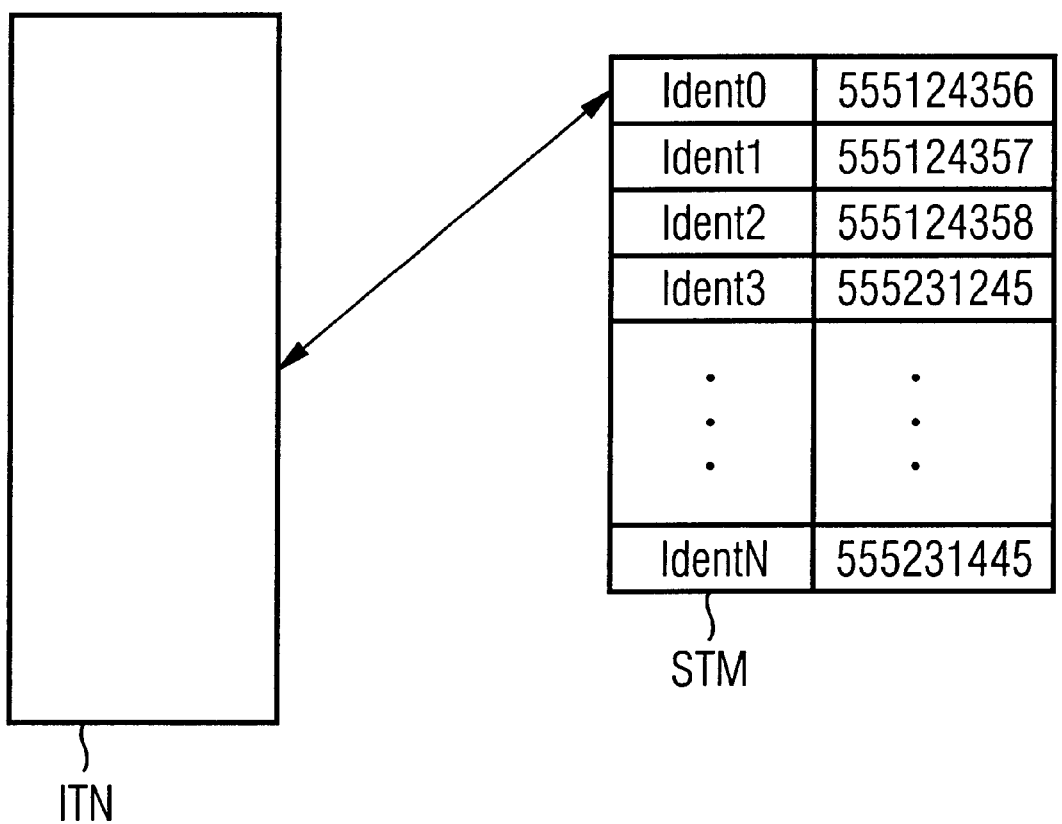
FIG. 5 shows a schematic illustration of a device in a node of a telecommunication network for mapping a desired call to a service.

In the following, an embodiment of the invention is explained by means of FIG. 5. FIG. 5 shows a software module ITN in a network node, which in co-operation with a memory STM forms a processing unit for mapping a desired call to a service. The memory STM contains both service identifiers and dialling numbers, wherein each of the dialling numbers is allocated to the corresponding service identifier. The memory contains, for example, the service identifiers Ident0, Ident1, Ident2, Ident3 and IdentN and the dialling numbers 555124356, 555124357, 555124358, 555231245 and 555231445. Each of the dialling numbers shown on the right-hand side is thereby allocated to the corresponding service identifier on the left-hand side. If, for instance, the service identifier Ident1 is transmitted to the node, the software module ITN establishes by means of said service identifier the dialling number 555124357 of the desired service from memory STM. The node thereafter starts to set up a call to the dialled service by means of the established dialling number. It an embodiment of the invention a plurality of dialling numbers is allocated to a service identifier. Each of the numbers is used for the provision of the service in a certain language. The dialling number for a certain service is selected according to a language indicator sent by a mobile user equipment or the interpretation of a network country code of the home telecommunication network of the calling party as described for FIG. 2.

The invention is suited for all services mentioned in the introductory part of the application. The inventive method is especially suited for mobile telecommunication networks such as GSM and UMTS networks.

In the following, a mobile user equipment according to the invention and a node are explained in more detail without using a figure.

The mobile user equipment according to the invention comprises an input unit for entering a desired call, such as a keyboard, or a unit for processing voice inputs or a menu-controlled input unit, a memory for storing at least one service identifier, a processing unit for mapping the desired call into a service identifier allocated to the desired call, a storage for storing character strings used for dialling services, a means for increasing the set of stored character strings when the mobile user equipment switches to a visited telecommunication network, and a sending unit for sending the allocated service identifier.

In a further embodiment of the invention, a mobile user equipment comprises a means for reducing the stored set of character strings when the mobile user equipment switches from a visited network.

In a preferred embodiment of the invention, the character strings stored in the storage of the mobile user equipment are allocated to the service identifiers stored in the memory of said equipment.

In an embodiment of the invention, the means for increasing the set of stored character strings receive during an attachment character strings allocated to service identifiers and store said character strings allocated to said service identifiers in the storage and the memory respectively.

The node according to the invention for a telecommunication network comprises at least one receiving unit for receiving a service identifier, a memory for storing at least one dialling number, a processing unit for converting the service identifier into a dialling number allocated to the service identifier, means for updating a set of character strings used for dialling services stored in a mobile user equipment, and means for setting up a call to the service allocated to the dialling number.

In an embodiment of the invention, the means for updating a set of character strings comprise means for detecting a new user equipment, for example during an attachment, a storage means storing character strings used for dialling services in the network and means for transmitting said character strings allocated to service identifiers to the mobile user equipment.

In an embodiment or the invention a node comprises means for recognizing a language indicator, and means for allocating dial numbers to the language indicator.

In a further embodiment of the invention, a node for a telecommunication network comprises a recognition unit for recognising a country code from subscriber identification and an allocating unit for allocating dialling numbers to country codes.

What is claimed is:

1. A method for dialing a service in a mobile telecommunication network, comprising:
   entering a desired call into a mobile user equipment;
   mapping the desired call into a service identifier in the mobile user equipment;
   transmitting the service identifier from the mobile user equipment to a node of the mobile telecommunication network;
   mapping the service identifier into a dialing number in the node of the mobile telecommunication network;
   setting up a call to a service allocated to the dialing number; detecting that the mobile user equipment has switched to a visited telecommunication network; and
   adding in the mobile user equipment a new set of character strings to be used in the visited telecommunication network for dialing services.

2. The method according to claim 1, further comprising:
   detecting that the mobile user equipment has switched from the visited telecommunication network; and
   deleting the set of character strings added in the mobile user equipment for the visited telecommunication network.

3. The method according to claim 1:
   wherein the input of the desired call is done by entering a character string into the mobile user equipment;
   wherein a comparison of the entered character string with pre-defined character strings is performed; and
   if the entered character string corresponds to a pre-defined character string, the desired call is mapped into the service identifier and the service identifier allocated to said character string is determined.

4. The method according to claim 1, wherein pre-defined character strings are stored on a subscriber identification card.

5. The method according to claim 1, wherein the node of the mobile telecommunication network is a control node of a core network of the mobile telecommunication network.

6. The method according to claim 1, wherein an identification of the calling subscriber is transmitted and wherein a preferred language for the dialed service is determined by means of the identification of the calling subscriber.

7. The method according to claim 1, wherein a language indicator is additionally transmitted from the mobile user equipment to the node and a preferred language is determined for the dialed service by means of the language indicator.

8. The method according to claim 1, wherein the dialed service is an emergency call service.

9. The method according to claim 1, wherein the mobile telecommunication network comprises a Global System for Mobile Communication (GSM) network.

10. The method according to claim 1, wherein the mobile telecommunication network is a Universal Mobile Telecommunication System (UMTS) network.

* * * * *